(12) United States Patent
Chiang

(10) Patent No.: US 9,307,226 B2
(45) Date of Patent: Apr. 5, 2016

(54) METHOD OF GENERATING A PHOTOGRAPH FOR AN E-MAIL NAME LIST BASED ON A DYNAMIC IMAGE

(76) Inventor: Kuo-Ching Chiang, Taipei (TW)

( * ) Notice: Subject to any disclaimer, the term of this patent is extended or adjusted under 35 U.S.C. 154(b) by 351 days.

(21) Appl. No.: 12/975,812

(22) Filed: Dec. 22, 2010

(65) Prior Publication Data

US 2011/0157313 A1 Jun. 30, 2011

(30) Foreign Application Priority Data

Dec. 31, 2009 (TW) ................................ 98146444 A

(51) Int. Cl.
| | | |
|---|---|---|
| *H04N 13/02* | (2006.01) | |
| *H04N 13/00* | (2006.01) | |
| *H04N 21/2365* | (2011.01) | |
| *H04N 21/4782* | (2011.01) | |

(52) U.S. Cl.
CPC ....... *H04N 13/0059* (2013.01); *H04N 21/2365* (2013.01); *H04N 21/4782* (2013.01)

(58) Field of Classification Search
CPC .......... H04N 1/00132; H04N 1/00172; H04N 1/00198; H04N 1/00196; H04N 1/00188
USPC ..................................................... 348/46, 43
See application file for complete search history.

(56) References Cited

U.S. PATENT DOCUMENTS

| | | | |
|---|---|---|---|
| 6,008,814 A * | 12/1999 | Baldwin et al. | 345/427 |
| 8,289,374 B2 * | 10/2012 | Watson | 348/43 |
| 2003/0048522 A1 * | 3/2003 | Liang et al. | 359/296 |
| 2003/0109286 A1 * | 6/2003 | Hack et al. | 455/566 |
| 2004/0106438 A1 * | 6/2004 | Chen | 455/566 |
| 2007/0081208 A1 * | 4/2007 | Chang et al. | 359/9 |
| 2007/0128899 A1 * | 6/2007 | Mayer | 439/152 |
| 2008/0007783 A1 * | 1/2008 | Terada | 358/1.18 |
| 2009/0049100 A1 * | 2/2009 | Wissner-Gross et al. | 707/104.1 |
| 2009/0254528 A1 * | 10/2009 | Tsao et al. | 707/3 |
| 2010/0103318 A1 * | 4/2010 | Wang et al. | 348/565 |
| 2010/0117885 A1 * | 5/2010 | Holbrook et al. | 342/22 |
| 2010/0159995 A1 * | 6/2010 | Stallings et al. | 455/566 |

* cited by examiner

*Primary Examiner* — Leron Beck
(74) *Attorney, Agent, or Firm* — Muncy, Geissler, Olds & Lowe, P.C.

(57) ABSTRACT

The present invention discloses a method of transmitting three dimensional information. The method includes providing a remote server having a three dimensional image database, and a local terminal device coupled to the remote server via network, wherein the local terminal device includes a stereo image display. The local terminal device transmits a request command for three dimensional images to the remote server through the network, followed by sending the desired three dimensional images to the local terminal device through the network.

12 Claims, 3 Drawing Sheets

METHOD OF GENERATING A PHOTOGRAPH FOR AN E-MAIL NAME LIST BASED ON A DYNAMIC IMAGE

FIELD OF THE INVENTION

The present invention relates to a network server, and more particularly to a server with stereo image databases and the method of transmitting stereo images.

BACKGROUND OF THE INVENTION

Electronic products have grown rapidly under the trend of light, thin, multi-functional and high speed demands while information technology and computer markets expand increasingly. Telecom network industry and internet network industry are emerging industries in recent years with the coming of high technology era. With the development of mobile phone integration technology, telecommunication system continuously provides more convenient methods for the user to obtain information. Therefore, the telecom technology has become a new favorite. Auxiliary business related to the telecom device also has developed increasingly because of the connection demand and the convenience of the obtainment of information. No matter internet network, mobile communication device or personal digital assistant (PDA) have been extremely common in human life. Internet provider and telecom provider lastingly provide commercial service to help the user to transfer or receive their data, so as to expand the range of the market and the service. Further, electronic components have developed towards diversities and multi-functions, for example lightness, thinness, tininess, multi-function and high speed. Meanwhile, telecom provider or information provider also has to provide diversified, omnibearing and new information to the customer. Web service provider also has to provide diversified services except depends on the income from the advertisement so as to increase the subscribers.

SUMMARY OF THE INVENTION

The present invention discloses a method of transmitting three dimensional (or stereo) images to a user terminal through a remote three dimensional image database. For example, shopping websites, auction websites, portal websites, online game servers, web photo databases, web advertising databases, wallpaper databases, screensaver databases, or blog servers can transmit three dimensional blog information, three dimensional advertisements, three dimensional online games, three dimensional products, three dimensional photographs, three dimensional news pictures, three dimensional wallpapers or three dimensional screensavers to the user terminal by utilizing the present invention.

The present invention discloses a method of transmitting three dimensional information, including providing a remote server including a three dimensional image database; providing a local terminal device connected to the remote server, wherein the local terminal device includes a stereo image display; the local terminal device transmitting a request command for three dimensional images to the remote server through a network; and the remote server sending the three dimensional images to the local terminal device through the network and displaying the three dimensional images through the stereo image display.

The three dimensional images include left eye information and right eye information, and the left eye information and the right eye information are transmitted alternately. In another embodiment, the stereo image display may cooperate with electronic glasses which utilizes micro shutters and can open the shutters quickly in synchronization with the images, such that each eye can receive correct 3D images in correct order.

The aforementioned three dimensional images sent by the remote server may be formed in webpage information, and the webpage information may include a command option for the local terminal device to issue a two dimensional image selection command; or/and the webpage information may include a command option for the local terminal device to issue a three dimensional image selection command; or/and the webpage information may include a command option for the local terminal device to issue a two dimensional/three dimensional image switch command. The local terminal device may include a computer, a tablet personal computer or a notebook. The local terminal device may further include a handheld communication device, for example a mobile phone, a personal digital assistant (PDA), a digital image capturing device with a wireless transmission module. The network may include mobile telecom network or internet network.

In another aspect, the present invention discloses a network server, comprising a processing unit; a database coupled to the processing unit; a network connecting module electrically coupled to the processing unit to transmit information through a network; a display electrically coupled to the processing unit; and wherein the database comprises a three dimensional image database so as to transmit three dimensional image information to a user terminal device through the network. The aforementioned network connecting module may include a WiFi transmission module, a WiMAX transmission module, a 3G transmission module, a 3.5G transmission module or a 4G transmission module. The network connecting module may further include a wired data transmission module.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are provided only for illustrating but not for limiting the scope of the Claims and wherein:

DETAILED DESCRIPTION OF THE PREFERRED EMBODIMENT

Figure 1:
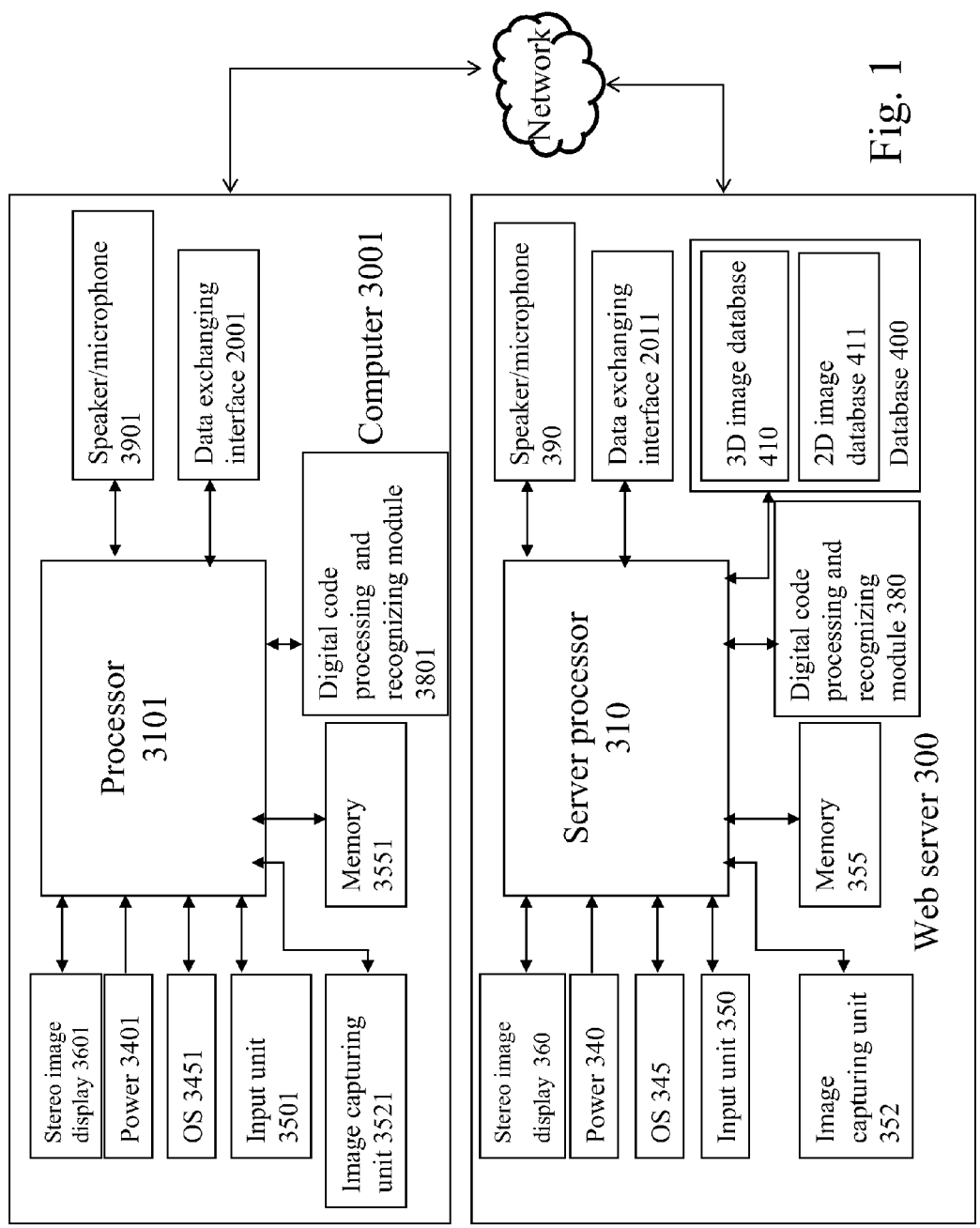
FIG. 1 illustrates a functional block diagram of the present invention.

To clarify the aforementioned and other objects, features and advantages of the present invention, the invention will now be described with the preferred embodiments and the attached drawings and these descriptions interpret structure and procedures of the invention only for illustrating but not for limiting the claims of the invention. FIG. 1 illustrates a functional block diagram of the present invention. The present invention discloses a server 300 and a computer 3001, which are coupled with each other through a wired or wireless network. The network may include, but be not limited to, internet network, telecommunication network, etc. With reference to FIG. 1, the computer 3001 at least includes a processor 3101 to control the processing of signals and data, an input unit 3501, a stereo image display 3601, an operating system 3451, and an image capturing unit 3521 to capture the image or digital information. The present device also includes a memory 3551 coupled to the processor 3101 to store the data and the operating system. Depending on different properties, the memory 3551 may include hard disk, read-only memory (ROM), random access memory (RAM), nonvolatile flash memory, etc. Finally, the audio signals are transmitted to an output unit, for example a speaker/microphone unit 3901. Digital code processing and recognizing module 3801 may capture digital codes through the image capturing unit 3521 and decode the digital codes under the instruction of the processor 3101. The decoded information is displayed or stored in the memory. Alternatively, the decoded information is displayed in specific columns through an application program. Therefore, when an enterprise entity or an organization needs to collect personal information, the personal information does not have to be obtained artificially, such that the efficiency may be upgraded and mistakes may be avoided. The user may copy the digital codes and acquire information implied therein through the decoder in the user terminal to reproduce information, which may include, but be not limited to, tables, documents, URLs, emails, images, personal information, tickets, telecom information, company names, company information, etc. The device in the aforementioned user terminal may include, but be not limited to, mobile phones, personal digital assistants (PDAs), notebooks (NBs), desktop computers, etc.

Stereo image display 3601 may be switched between a planar image display mode and a stereo image display mode to display two dimensional or three dimensional images. In other words, stereo image display 3601 may be performed by constructing cylindrical lens on a liquid crystal display, for example, Sharp's Auto3D LCD, horizontal interleaved 3D display, such as vRex microPol 3D LCD, vertical interleaved 3D LCD, such as DTI, Pavonine, etc. An U.S. patent publication No. 2009/0153653 also discloses a stereo screen. The aforementioned is only an embodiment, not for limiting the present invention.

FIG. 1 illustrates a web server 300 to facilitate other persons to obtain information. The web server 300 includes a server processor 310 to control the processing of signals and data, an input unit 350, a stereo image display 360, a server operating system 345, and an image capturing unit 352 to capture the image or digital information. The present device also includes a memory 355 coupled to the server processor 310 to store the data and the server operating system. Depending on different properties, the memory 355 may include hard disk, read-only memory (ROM), random access memory (RAM), nonvolatile flash memory, etc. Finally, the audio signals are transmitted to an output unit, for example a speaker/microphone unit 390. Digital code processing and recognizing module 380 may capture digital codes through the image capturing unit 352 and decode the digital codes under the instruction of the server processor 310. The web server 300 further includes an information database 400, which stores web information and further includes a two dimensional image database 411 to store two dimensional web information and a three dimensional image database or/and a three dimensional online game database 410 to store three dimensional web information or/and three dimensional image or/and three dimensional online programs, so as to transmit the web information including two dimensional or three dimensional digital image information to the user through internet network and display the information on the display of the user through a browser. To display the three dimensional information, the device in the user terminal has to include the aforementioned stereo image display 3601.

Stereo or three dimensional images are captured by the three dimensional image capturing unit 352 and are fed into the three dimensional image database 410 in the information database 400 through a data exchanging interface 2011. The three dimensional image capturing unit 352 may include at least two image capturing components spaced apart in a distance and corresponding lens. The image capturing components may be CMOS (complementary metal-oxide semiconductor), CCD (charge-coupled device), etc with a plurality of micro lens disposed thereon to converge light and form stereo images. The distance between the two image capturing components may preferably be about the distance between two pupils of humans. The two spaced apart image capturing components simulate the way in which humans observe objects and capture images simultaneously from different angles of view to generate images with slightly different angles of view.

Figure 2:
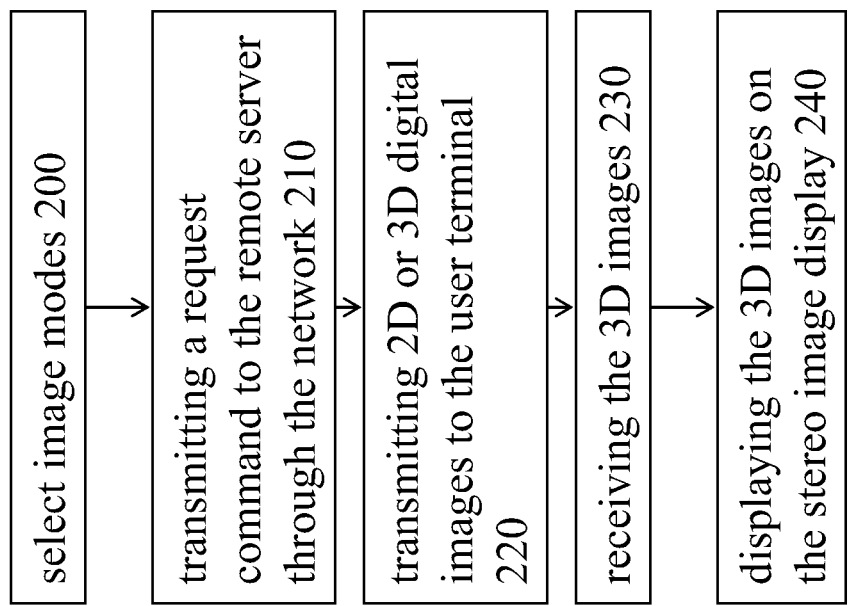
FIG. 2 illustrates a flow chart of the present invention.

The transmitted webs include virtual buttons or icons for switching two dimensional or three dimensional digital images, in order for the user to select image modes in step 200 with reference to FIG. 2. When a local terminal user clicks the virtual buttons or icons, a request command may be transmitted to the remote server 300 through the network in step 210 with reference to FIG. 2. After the server analyzes the command, two dimensional or three dimensional digital images are transmitted to the user terminal in step 220 with reference FIG. 2. If the three dimensional image mode is selected, the server will transmit the three dimensional web information or three dimensional images or three dimensional online games to the user. In one embodiment, left eye information and right eye information may be transmitted to the user in order. In other words, multiple pairs of left eye information and right eye information are transmitted during the visual persistence period of human eyes, in which left eye information and right eye information are transmitted alternately and by interleaving; and the interval thereof may be one or two left eye or right eye information so as to transmit left eye information or right eye information respectively. The information to be transmitted may be only the three dimensional images, or both the two dimensional images and the three dimensional images, i.e. partial three dimensional images combined in two dimensional electronic documents.

The computer 3001 of the local terminal user may receive the three dimensional images through a data exchanging interface 2001 via the wireless or wired network in step 230. Subsequently, the three dimensional images are displayed on the stereo image display 3601 in step 240.

In the present invention, a handheld communication device can also be utilized to receive web pages. The handheld communication device may include, but be not limited to, smart phones, mobile phones, pagers, personal digital assistants (PDAs) or any similar devices. The aforementioned wireless communication devices usually include a wireless communication module, which is adapted to bi-directional transmission protocols. The mobile phones and the personal digital assistants at least include a bi-directional communication module. The communication protocols for the bi-directional communication module may be GSM (global system for mobile communications), CDMA (code division multiple access), PHS (personal handy-phone system), 3G, 3.5G, 4G or bi-directional pager protocols. The messages provided by the service provider are received by the bi-directional communication module and then are decoded by the decoding device to convert into recognizable signals. The wireless communication device includes a microprocessor or a central processing unit and a user interface coupled with the microprocessor to input commands. The way to input commands may be the touch control or the voice control to input by voice. The signals received by the bi-directional communication module are processed by the microprocessor in cooperation with data or programs stored in the memory unit. For example, protocol comparison, interpretation and judgment are performed. The received information may be displayed on a display device, which usually is a liquid crystal display (LCD) or a planar display device.

Figure 3:
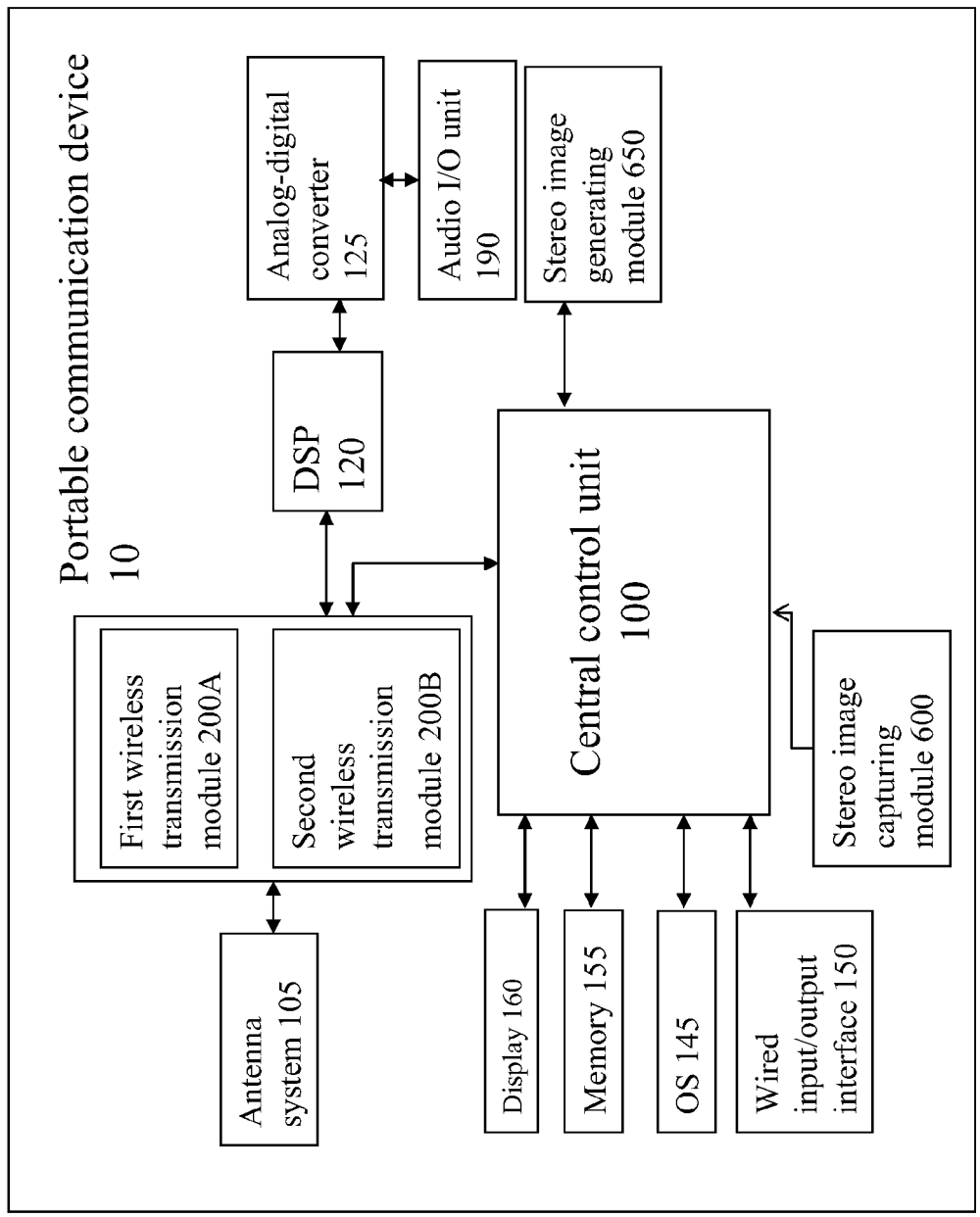
FIG. 3 illustrates a functional block diagram of the present invention.

FIG. 3 illustrates functional blocks of a portable communication device 10 with a stereo image capturing module. If the stereo image capturing module is embedded into a mobile phone, the portable communication device 10 may include a SIM (subscriber identity module) card connector, which can receive SIM card. The SIM card connector is conventional and therefore related descriptions are omitted. In other types of mobile phones, for example PHS or some CDMA system, the SIM card is not necessary. This drawing is for illustrating but not for limiting the claims of the present invention. The portable communication device 10 includes a wireless data transmission module 200A, which may be video RF (radio frequency) module to transmit or receive mobile phone signals. The video RF module is well known to the person having ordinary skill in the art. As well known in the art, the video RF module is coupled to an antenna system 105, which may include single one or multiple pairs of antennas depending on demands. The video RF module may include a base band processor, etc. The antenna system is connected to a radio transceiver to receive and transmit signals. The wireless data transmission module 200A is compatible to several kinds of mobile protocols, for example W-CDMA, CDMA2000, CDMA2001, TD-CDMA, TD-SCDMA, UWC0136, DECT, 4G systems, etc. These systems render the user to communicate through video communication. The video RF module may be utilized to perform transmission and reception of signals, synchronization of frequencies, base band processing and digital signal processing, etc. The SIM card connector is utilized to receive the SIM card. Finally, the signals are transmitted to an audio input/output unit 190.

The portable communication device 10 may include a digital signal processor (DSP) 120 or/and a central control unit 100, a codec (not shown) and an analog-digital converter 125. The configuration of the components depends on the application. The portable communication device 10 may further include a display 160, an operating system 145 and a memory 155. The memory 155 includes a read-only memory (ROM), a random access memory (RAM) and a nonvolatile flash memory. The aforementioned units may be coupled to the central control unit 100 or the digital signal processor (DSP) 120 respectively. The memory may be nonvolatile memory or micro drive (MD). A wired input/output interface 150 is coupled to the central control unit 100. The wired input/output interface 150 may be universal serial bus (USB) or IEEE1394.

The portable communication device 10 may also include a second wireless data transmission module 200B, which may use a protocol with shorter transmission distance than the first wireless data transmission module 200A, for example WiFi, WiMAX, etc. In one embodiment, the second wireless data transmission module 200B may utilize a wireless short-distance (local area) network module and be compatible to local area network (LAN) or metropolitan area network (MAN) protocol or other standards, for example the WiFi standard or the 802.11x (x=a, b, g, n) standard compatible module. Short-distance means that the communication distance thereof is shorter than the communication distance of the mobile phone. Moreover, the second wireless data transmission module 200B may be compatible to the WiMAX standard. The user can connect to internet network or hot spots through WiFi or WiMAX.

A stereo image capturing module 600 and a stereo image generating module 650 are coupled to the DSP 120 or/and the central control unit 100. The stereo image capturing module 600 includes at least two image capturing components spaced apart in a distance and corresponding lens. Alternatively, the user may take the image with slightly different angles by using one image capturing component under the stereo image capturing mode, thereby generating the stereo image by the stereo image generating module 650 and omitting one image capturing component. The image capturing components may be CMOS (complementary metal-oxide semiconductor), CCD (charge-coupled device), etc with a plurality of micro lens disposed thereon to converge light and form stereo images. The distance between the two image capturing components may preferably be about the distance between two pupils of humans. The two spaced apart image capturing components simulate the way in which humans observe objects and capture images simultaneously from different angles of view to generate images with slightly different angles of view. Preferably, the two image capturing components are disposed along the long axis direction of the communication device. After the at least two captured images are stored, they are synthesized by the stereo image generating module 650 to generate similar or virtual stereo images, so as to generate stereo images, photographs, stereo wallpapers in the screen, or stereo images for phone books or email name lists. The stereo images are generated through left eye and right eye stereo image pairs. The necessary processes usually include adjustment of stereo image pairs. The adjustment process includes zoom in, zoom out, rotation, shift, swapping left and right images, trim and smooth display by the noise reduction. The stereo images may be displayed on the 3D display 160, for example, Sharp's Auto3D LCD, horizontal interleaved 3D display, such as vRex microPol 3D LCD, vertical interleaved 3D LCD, such as DTI, Pavonine, etc. An U.S. patent publication No. 2009/0153653 also discloses a stereo screen. The stereo images captured by the present portable communication device, after processed, may be uploaded to websites, blogs or others through the first wireless data transmission module 200A or the second wireless data transmission module 200B directly and conveniently. The stereo images need not to be stored into a memory card in order to be uploaded through a computer. The stereo image generating module 650 may also be disposed in the remote terminal. The images captured by the stereo image capturing module 600 may be transmitted to a remote terminal through the second wireless data transmission module 200B or the first wireless data transmission module 200A connected with a remote computer or a server, and then may be processed in the remote terminal. Alternatively, when connected with the remote terminal, the portable communication device 10 may be utilized directly to call and activate the stereo image generating module 650 in the remote terminal to perform the stereo image generating procedures, and the result may be stored in the remote computer, the server or the portable communication device 10.

The present invention may render many website users to enjoy the fun of three dimensional contents and services, and can obtain and transmit the three dimensional information to the user terminal through the remote computation. The aforementioned remote server may include shopping websites, auction websites, portal websites, online game servers, web photo (or dynamic images) databases, web advertising databases, email cards, electronic tickets (or coupons), wallpaper databases, screensaver databases, blog servers, etc. The aforementioned three dimensional images may include three dimensional blog information, three dimensional advertisements, three dimensional online games, three dimensional products, three dimensional photographs, three dimensional (dynamic) images, three dimensional news pictures, three dimensional wallpapers, three dimensional screensavers, etc.

Accordingly, the present invention discloses a user terminal device. The user terminal device includes a processing unit; a memory coupled to the processing unit; a stereo image display electrically coupled to the processing unit, wherein the memory stores three dimensional wallpapers or three dimensional screensavers to display them through the stereo image display. The user terminal device may include computers, notebooks or handheld communication devices.

The foregoing description is preferred embodiments of the present invention. It should be appreciated that these embodiments are described for purposes of illustration only, not for limiting the claims of the present invention, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A method of generating a photograph for a mail account list of another user terminal based on an image, comprising:
   providing a remote server having photograph generator for said mail account list, wherein said remote server is connected by a user terminal, wherein said user terminal includes a smart phone or a computer;
   receiving at least one image by said remote server, wherein said at least one image is captured by said user terminal using a complementary metal-oxide semiconductor (CMOS) camera or a charge-coupled device (CCD);
   generating a mail account photograph by said photograph generator of said remote server, using said at least one captured image, for distribution to said mail account list of said another user terminal;
   trimming said mail account photograph for said mail account list of said another user terminal by said photograph generator;
   storing said mail account photograph in mail account photograph database of said remote server; and
   transmitting said mail account photograph from said mail account photograph database of said remote server to said another user terminal when said another user terminal sends a request command to said remote server, wherein said remote server sends said mail account list to said another user terminal, wherein said mail account photograph is displayed to said mail account list of said another user terminal.

2. The method of claim 1, wherein said user terminal device includes WiFi for transmitting said photograph to said remote terminal.

3. The method of claim 2, wherein said photograph includes a three dimensional image.

4. The method of claim 1, wherein said user terminal device includes an RF module for transmitting said photograph to said remote terminal.

5. The method of claim 4, wherein said photograph includes a three dimensional image.

6. The method of claim 1, furthering comprising:
   a stereo image generating module, wherein said image capturing device is either a complementary metal-oxide semiconductor (CMOS) camera or a charge-coupled device (CCD) and wherein images are transmitted to said stereo image generating module from said image capturing device.

7. The method of claim 1, furthering comprising:
   a stereo image generating module, wherein said image capturing device is either a complementary metal-oxide semiconductor (CMOS) camera or a charge-coupled device (CCD) and said user terminal device is a computer, wherein two images with different angles are captured and wherein said two images with different angles are transmitted to said stereo image generating module, in said user terminal, from said image capturing device, thereby generating a stereo image.

8. A method of generating a photograph for a mail account list of another user terminal by a user terminal device, comprising:
   providing said user terminal device having a control unit, an image capturing device being coupled to said control unit, a display coupled to said control unit for displaying, wherein said user terminal device is a smart phone, wherein said image capturing device is either a complementary metal-oxide semiconductor (CMOS) camera or a charge-coupled device (CCD);
   storing an image in said user terminal device;
   providing a remote server having photograph generator for said mail account list, wherein said remote server is connected by a user terminal device;
   receiving at least one image by said remote server, wherein said at least one image is captured by said user terminal using said image capturing device;
   generating a mail account photograph by said photograph generator of said remote server using said at least one captured image for distribution to said mail account list of said another user terminal;
   storing said mail account photograph in mail account photograph database of said remote server, wherein said mail account photograph is displayed to said mail account list of said another user terminal.

9. The method of claim 8, furthering comprising:
   a stereo image generating module, wherein two images with different angles are captured and wherein said two images with different angles are transmitted to said stereo image generating module to generate a stereo image.

10. The method of claim 8, wherein said user terminal device includes WiFi for transmitting said photograph to said remote terminal.

11. The method of claim 8, further comprising:
    zooming in, zooming out, rotating, shifting said photograph.

12. The method of claim 8, further comprising transmitting said photograph from said remote server to another user terminal.

* * * * *